United States Patent [19]

Cockayne

[11] Patent Number: 5,579,695
[45] Date of Patent: Dec. 3, 1996

[54] ASSEMBLY LINE SYSTEM HAVING PUCK GUIDED PALLETS AND TRACK ENGAGING BRAKE MEMBERS

[75] Inventor: David J. Cockayne, West Midlands, United Kingdom

[73] Assignee: Flexible Assembly Equipment Limited, Birmingham, United Kingdom

[21] Appl. No.: 164,722

[22] Filed: Dec. 10, 1993

[51] Int. Cl.⁶ .................................................. B61B 12/00
[52] U.S. Cl. ...................... 104/140; 104/106; 104/172.3; 198/840; 198/345.3; 188/40; 293/6; 180/276
[58] Field of Search ...................... 104/106, 140, 104/146, 165, 172.1, 172.3; 105/170; 198/838, 840, 345.3, 803.01; 188/38, 38.5, 40, 41, 44, 63; 303/135; 293/3, 6; 180/275, 276

[56] References Cited

U.S. PATENT DOCUMENTS

| | | |
|---|---|---|
| 507,366 | 10/1893 | Hood .......................................... 188/40 |
| 586,166 | 7/1897 | Dougherty .................................. 293/6 |
| 2,538,144 | 1/1951 | Carretto ..................................... 198/840 |
| 2,826,319 | 3/1958 | Renner et al. ........................ 104/165 X |
| 3,797,406 | 3/1974 | Biessener ................................ 180/276 |
| 3,822,648 | 7/1974 | Ishii et al. ............................ 188/40 X |
| 3,907,265 | 9/1975 | Hustead . | 
| 4,394,897 | 7/1983 | Brems .................................. 198/345.3 |
| 4,535,827 | 8/1985 | Seaford . | 
| 4,559,669 | 12/1985 | Bonzer et al. . | 
| 4,691,640 | 9/1987 | Murai ...................................... 104/140 |
| 4,718,349 | 1/1988 | Wahren ................................... 104/165 |
| 4,930,623 | 6/1990 | Johnson et al. ................... 104/172.3 X |
| 4,981,207 | 1/1991 | Kuikka ............................... 198/803.01 |

FOREIGN PATENT DOCUMENTS

| | | |
|---|---|---|
| 1194969 | 6/1970 | United Kingdom . |
| 2008064 | 5/1979 | United Kingdom . |
| 2043549 | 10/1980 | United Kingdom . |

*Primary Examiner*—S. Joseph Morano
*Attorney, Agent, or Firm*—Cushman Darby & Cushman, L.L.P.

[57] ABSTRACT

An assembly line system has a pallet travelling along a work top of a work table section. The table section has a track along which a cardanic chain moves to convey pucks connected to the underside of the pallet in spring-loaded manner, by means of frictional engagement between the chain and pucks. The pallet is provided with a set of castors having resilient wheels. Passageways convey the pneumatic supply necessary for operating various items of equipment along the assembly line. The assembly line system also includes an adjustable track bend. In a modification the pucks are locked in the track.

8 Claims, 8 Drawing Sheets

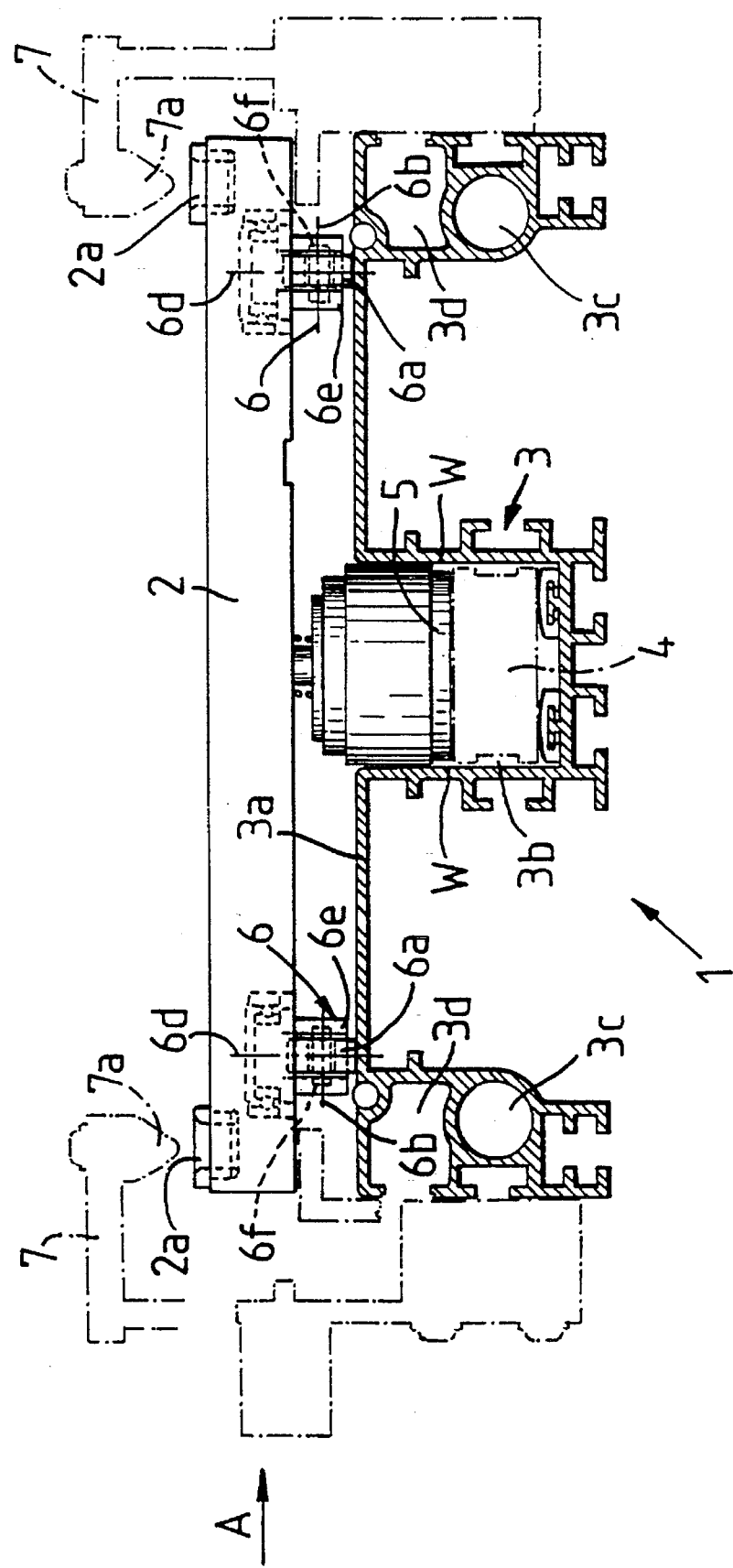

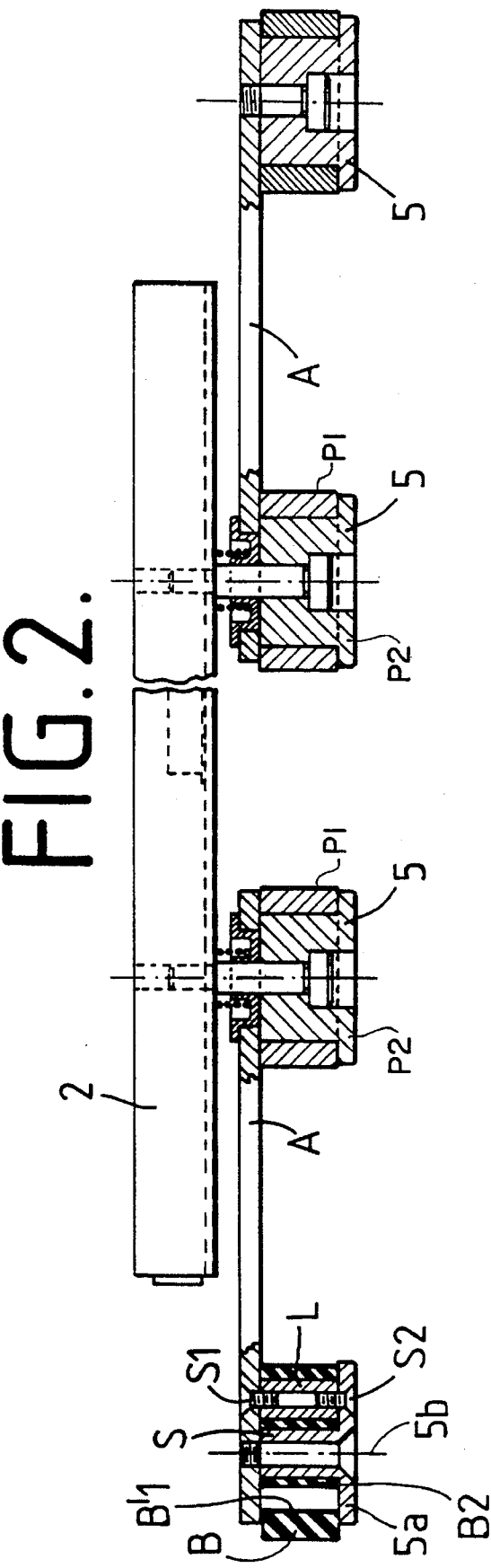
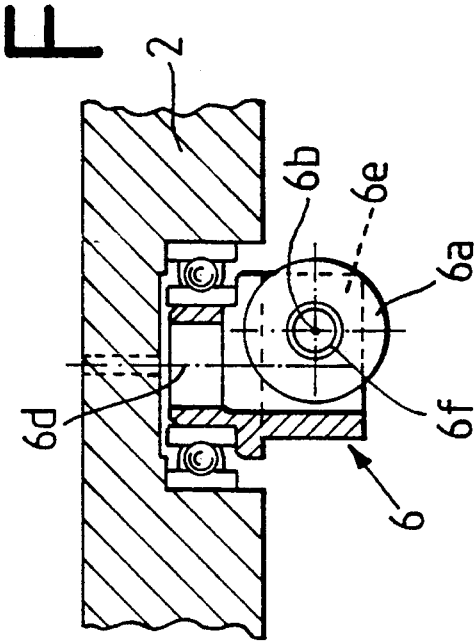

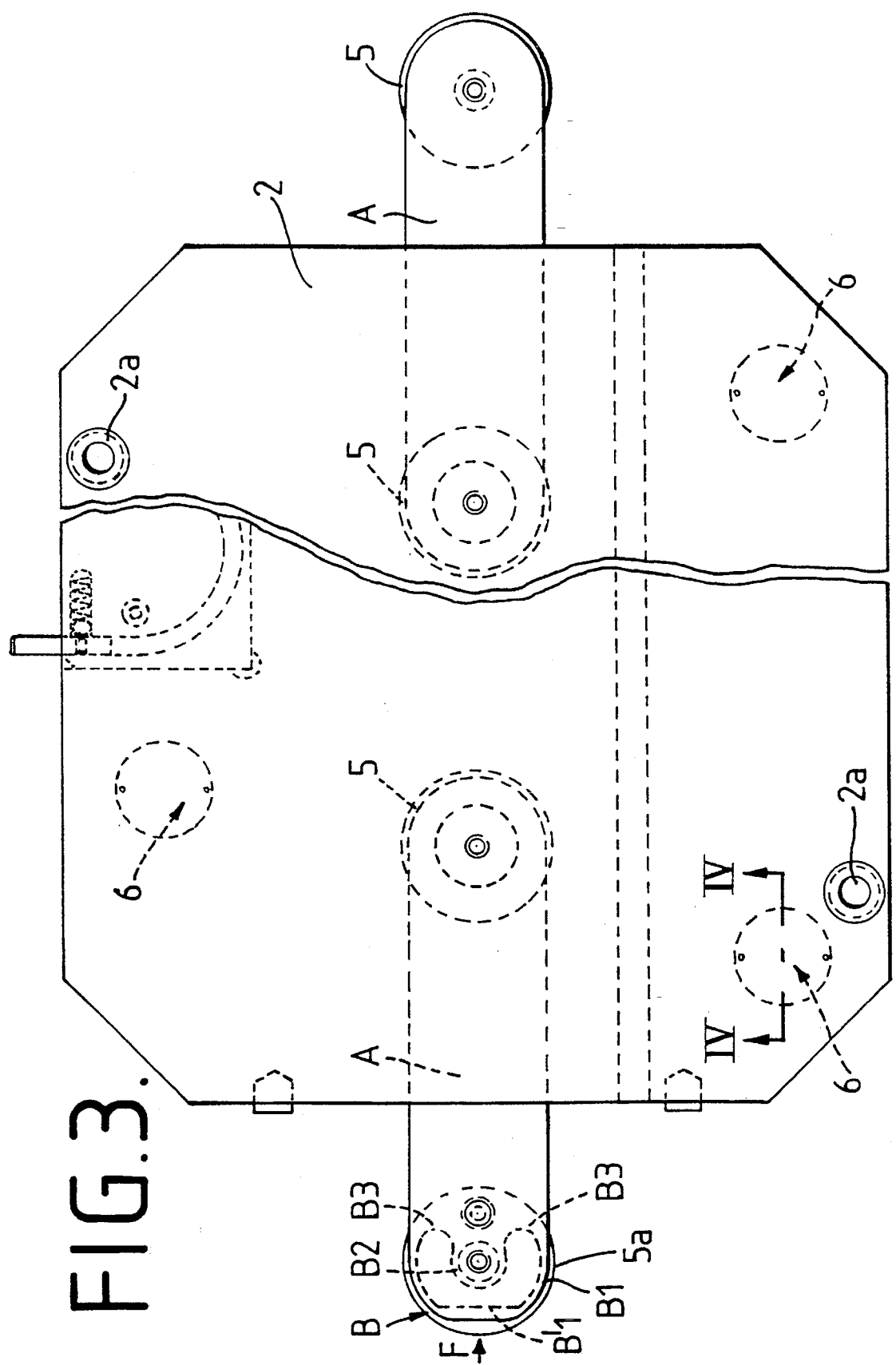

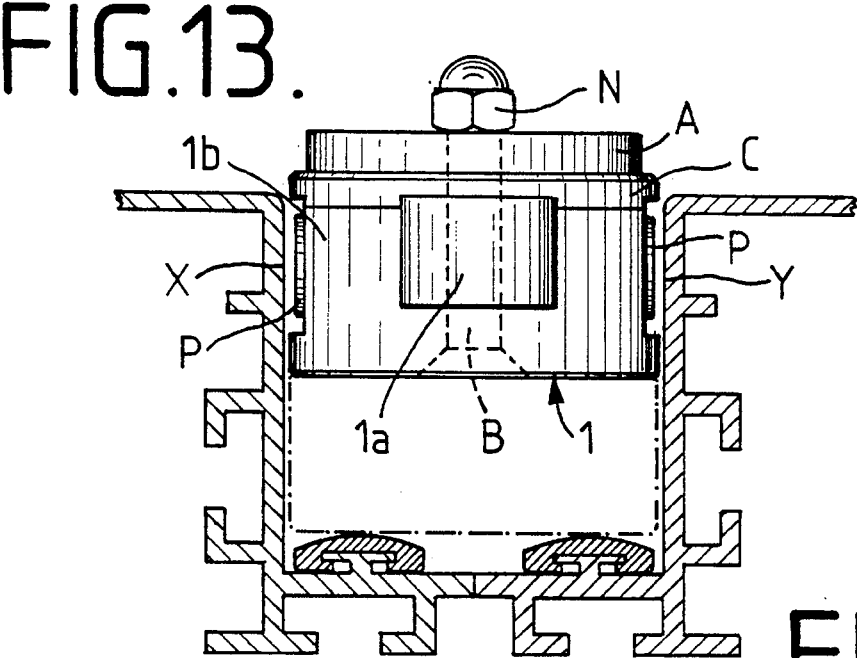
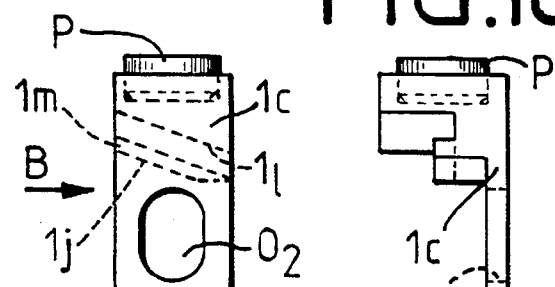
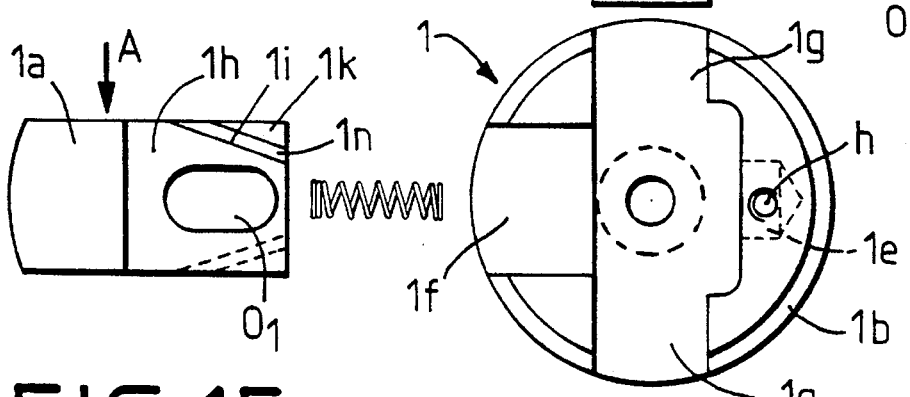
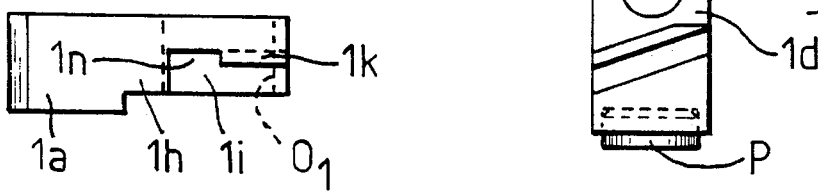

ASSEMBLY LINE SYSTEM HAVING PUCK GUIDED PALLETS AND TRACK ENGAGING BRAKE MEMBERS

This invention relates to improvements in or relating to assembly line systems, in which pallets or platens carrying workpieces are conveyed along an assembly line to work stations at which work operations are carried out on the workpieces.

In prior art assembly line systems workpieces are carried on pallets that run along an assembly line, the pallets have pucks which run in tracks, said pucks being in frictional engagement with a conveyor means usually in the form of a rubber belt or cardanic chain. It is believed that such systems tend to have disadvantageous features relating to cost ease operation of the assembly line apparatus, convenience of use and safety.

It is an object of the present invention to provide an assembly line system which is improved in at least some respect or which alleviates one or more of the aforementioned or other, disadvantages associated with such systems.

According to a first aspect of the present invention there is provided a pallet for an assembly line system said pallet having a plurality of castors or roller means arranged to run along a work table or work top of the assembly line system, said castors or roller means being inherently resilient or resiliently mounted on the pallet.

According to a second aspect of the present invention there is provided an assembly line system including a work top or table defining a track or slot for conveyor means that acts to convey pucks of a pallet along the work top/table by frictional engagement of the pucks with the conveyor means, the edges of the conveyor means being covered (preferably by flange means in the slot) thereby preventing access to said edges whilst said pallet is conveyed along the assembly line.

Preferably, the pucks are locked in position for movement along said tracks/slots so that the pallet cannot be lifted from the work top/table. Removal of a pallet from the work table by an operator can cause problems in performing correct work operations in sequence on the pallets and this disadvantage can be substantially avoided by locking the pallets in position to run along the slots. In order to check that no pallets have been removed from the assembly line it is necessary to tag each pallet uniquely which is more expensive than employing shift registers in the system. Such shift registers can be used reliably where the pallets are constrained to movement along the tracks/slots only.

According to a further aspect of the present invention there is provided an assembly line system including a work table or support having passageways extruded or formed therein for conveying air to pneumatic equipment of the assembly line system and/or for electrical cables. The passageways may or may not receive pneumatic tubing to carry the air. Preferably, passageways are provided to and from said pneumatic equipment in order to convey reclassified air away from said equipment.

According to a further aspect of the present invention there is provided an assembly line system including a worktop or table defining a track or slot for conveying means that acts to convey pucks of a pallet along the work top/table by frictional engagement of the pucks with the conveyor means, said pucks being locked in the track/slot for movement therealong.

According to a further aspect of the present invention there is provided an adjustable bend for an assembly line system, said bend being adjustable to allow pallets to be conveyed through a selected angle by conveyor means along an assembly line of the system.

According to a further aspect of the present invention there is provided a work top or work table for an assembly line system, comprising a track or slot to entrain pucks of a pallet to to move therealong said top or table comprising an assembly of a plurality of parts or extrusions which define opposite sides or side walls of the track or slot.

According to a further aspect of the present invention there is provided a puck for a pallet movable along a track or slot in a worktop or work table of an assembly line, said puck having a rotatable sleeve in order to reduce frictional effects on the puck should it contact a side or side wall of the track or slot, in use.

BRIEF DESCRIPTION OF THE DRAWINGS

The present invention will now be described, by way of example only, with reference to the accompanying FIGURES of the drawings in which:

FIG. 1 shows a part-sectional view of a pallet positioned on a work table looking along the direct of conveyor means;

FIG. 2 shows a side view of the pallet looking in the direction of arrow A of FIG. 1;

FIG. 3 shows a plan view of the pallet;

FIG. 4 shows on a larger scale, a section taken on line IV—IV of FIG. 3;

FIG. 13 shows a front view of the puck positioned in a track or slot and looking in a direction along the track or slot;

FIG. 14 shows an exploded view of the components of the puck;

FIG. 15 shows a view of a braking member looking in the direction of arrow A of FIG. 14, and FIG. 16 shows a view of a braking element looking in the direction of arrow B of FIG. 14.

Figure 5:
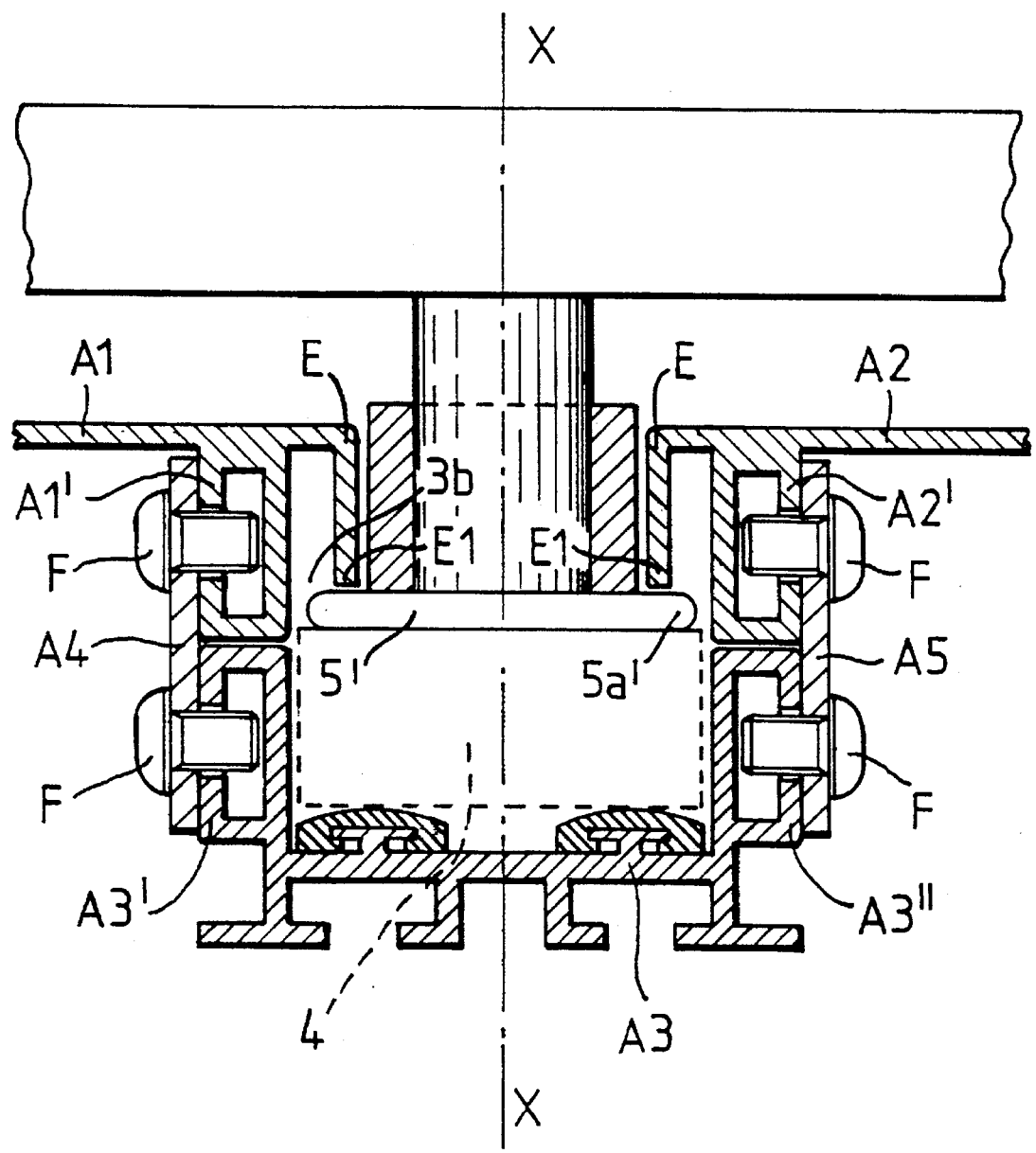
FIG. 5 shows a view similar to the central region of FIG. 1 but drawn to a larger scale and showing a modification.

Referring more particularly to FIG. 1, an assembly line system 1 shows a pallet 2 travelling along a work top or table top 3a of a work table section 3. The work table section 3 is a metal extrusion incorporating a track or slot 3b along which conveyor means in the form of a cardanic chain 4 moves in order to convey pucks 5 (only one shown in FIG. 1) connected to the underside of the pallet 2 in a spring-loaded manner, by means of a frictional engagement between the chain and pucks. Advantageously, the extruded section 3 includes cylindrical passageways 3c utilised for conveying the pneumatic supply necessary for operating various items of equipment (for example clamps) along the assembly line. The passageways 3c of the extruded section 3 will be aligned with similar passageways in an adjoining table section and the pneumatic airline (for example rubber tubing having an outer diameter corresponding generally with the diameter of the passageway 3c) can be threaded through the aligned passageways. In this way, the pneumatic supply to various equipment along the assembly line can be constructed easily and safely and is arranged neatly out of the way of any of the parts of the assembly line. It may be that suitable sealing could be provided between the extruded table sections $3c$ linking together the passageways $3c$ rendering the provision of a separate tubing in the passageways unnecessary with rubber seats being provided between the sections $3c$, the aligned passageways themselves providing the pneumatic ducting to service items of equipment. Additionally, and advantageously, the table section $3c$ is provided with ducts $3d$ as shown which are for electrical cabling appropriate to operation of the assembly line. Once again such ducting provides that the cabling can be neatly located and protected from other parts of the assembly line. The ducts $3d$ (and indeed the passageways $3c$) are located on opposite sides of the track slots $3b$ near the sides of the table 3.

Advantageously, each pallet 2 is provided with a set of four castors or roller means 6 (see FIGS. 1,3 and 4) which act to help the pallet to run smoothly along the table top $3a$ as well as obviating the need for any reciprocable clamping means engaging the underside of the pallet during clamping at a work station. In prior art assembly line systems usually the pallets are not provided with castors or rollers and when it is desired to clamp a pallet at a work station so that an operation can be carried out on a workpiece (not shown) carried by the pallet, reciprocable pins are moved upwardly through the table top $3a$ to engage the underside of the pallet whilst clamping means 7 (see FIG. 1) having tapered clamping heads $7a$ is moved vertically downwardly to seat in pallet bushes $2a$ in order to firmly hold the pallet whilst a work operation is carried out on a workpiece (not shown). Providing the castors 6 (as shown) completely eliminates the need for providing the relatively expensive equipment (with reciprocable pins) required for engaging the underside of the pallet during such clamping operation. Instead, the castors 6 have resilient wheels or rollers $6a$ mounted about axes $6b$ as shown, such wheels $6a$ being able to yield on application of a downward force of the pallet 2 by clamping means 7, enabling the pallet to be firmly clamped whilst the work operation is carried out on the workpiece. A fixed stop (not shown) may be provided for preventing a downward movement of the pallet 2 which is too great relative to the work table 3. As should be evident from FIGS. 1,3 and 4 the castor wheels or rollers $6a$ are able to rotate about axes $6b$, said axes being arranged in a plane parallel to the pallet, and additionally each castor is rotatable about a vertical axis $6d$. Thus each castor 6 is able to rotate about 2 axes. Further, the wheel or roller $6a$ of each castor 6 is mounted between two support members $6e$ on axles $6f$ each end of which is supported in an associated support member $6e$. In one known prior art arrangement metal rollers are provided on the pallet which extend from opposite sides of the pallet rather than from the underside and these rollers have axles which are only supported at one end. The rollers are metal and non-resilient and run in precision engineered tracks in the table top. However, in such systems when the pallet is clamped at the work station it is still necessary for vertically reciprocable equipment to be provided for engaging the underside of the pallet during clamping, said castors not being provided for the purpose of the present invention. Additionally, no tracks are necessary for the castors of the present invention. The present invention provides pallets which travel along the assembly line in a precision engineered manner without requiring the precision engineering necessary of the aforedescribed prior art system.

Referring more particularly to FIGS. 2 and 3, the pallet 2 has a front puck $5a$ provided with an elastic ring buffer B of advantageous form. The buffer B has an outer rubber elastic ring portion B1 integrally formed with an inner coaxial ring portion B2 joined to the outer ring portion B1 by two rearwardly curved wall portions B3 (see FIG. 3). The inner diameter of the inner ring portion B2 corresponds with the outer diameter of stem portion S of the puck $5a$ which is assembled in the manner shown. A screw is located from the underside of the puck centrally of the stem S which screw into the underside of link arm A. The general form of the pallet 2 with pucks 5 and link arms A is generally known and thus will not be fully described here. The rear portion of the arresting buffer B is held by screws S1 and S2 (see FIG. 2) and inner sleeve L so that the arresting buffer as a whole (and in particular the inner ring portion B2) resists rotation about the axis $5b$ of the puck. Thus, during travel of the pallet 2 should the arresting buffer meet with the force F in the direction as shown more particularly in FIG. 3, the outer elastic ring portion B1 deforms in a resilient cushioning manner until the inner straight edge portion B1' engages the outer periphery of the inner elastic ring portion B2. Thus, the outer elastic ring portion B1 deforms to a generally squashed oval shape increasing its dimension across the table top track or slot $3b$, frictionally engaging the side walls of the slot W to halt the progress of the pallet. It is believed that this form of elastic buffer is of a particularly advantageous and effective design.

A second spring-loaded puck 5 is provided spaced from puck $5a$ at the opposite end of link arm A and, advantageously, this puck is provided with a sleeve P1 rotatable relative to the puck body P2 of top-hat shape. Should the puck 5 contact the side walls of the slot $3b$ the sleeve P1 is free to rotate reducing frictional effects and increasing the smooth travel of the pallet along the assembly line. As shown in FIG. 2 a pair of pucks 5 is also provided at the rear of the pallet 2 on a second link arm A and each of these is provided with a rotatable sleeve P1, the most forward puck being spring-loaded.

FIG. 5 shows an enlarged central region of FIG. 1 which has been modified advantageously so that the normally exposed edges of the cardanic chain 4 are covered all the way along the slot $3b$ by overhanging strips E of L-shaped cross section. The arrangement as shown in FIG. 5 advantageously increases the safety of the assembly line system by a large factor since access to the exposed edges of the chain 4 can be dangerous and such access is now precluded by the arrangement shown in FIG. 5. Additionally, it will be noted that the strips E have horizontal edge surfaces E1 which act to retain the pucks 5' lockingly in the slot $3b$ with an annular shoulder $5a'$ being formed on the puck 5' extending underneath the edge surfaces E1 in a manner which should be evident from FIG. 5. Advantageously, freely rotatable sleeve P1 is provided on puck body P2. Instead of providing a single aluminium extrusion incorporating the slot $3b$ (as in FIG. 1) now three aluminium extrusions A1, A2 and A3 are provided in order to solve the engineering problem of designing the work table to cover the edges of the cardanic chain and retain the pucks 5' in the slot $3b$ thus retaining the pallets to the work table whilst allowing motion along the slot $3b$. Extrusions A1 and A2 are similar and comprise opposite sides of the slot $3b$. Extrusion A3 comprises a piece bridging the gap between extrusions A1 and A2 as shown in FIG. 5. Longitudinal plates A4 and A5 are secured to respective side portions A1' and A2' of the extrusions A1 and A2 as well as to respective side portions A3' and A3" of the extrusion A3 by respective screws or fasteners. It is believed that the particular way of forming the worktable from three extruded sections rather than one allows easier assembly thereof, and ease of manufacturing and allows advantageous safety features to be provided without large additional costs being involved. Also, such a construction allows the worktable to be more easily disassembled and stored should the need arise. It is possible that two rather than three extrusions might be provided in order to accomplish the same result as the three shown in FIG. 5 with the worktable being split into two halves along the central line X—X of the puck shown in FIG. 5.

Most importantly, it has been realised that the extrusion configuration A1,A2,A3 allows a much more versatile approach to the construction of assembly line systems. For example, extrusion A2 could be easily removed from the extrusion assembly which could then be interfaced with any other suitable module or cell components, such as shown in our co-pending G.B. Patent Application filed Sep. 7, 1992, now GB Patent No. 2270290 (see pages 16–18), the content of which is hereby incorporated by reference.

Figure 6:
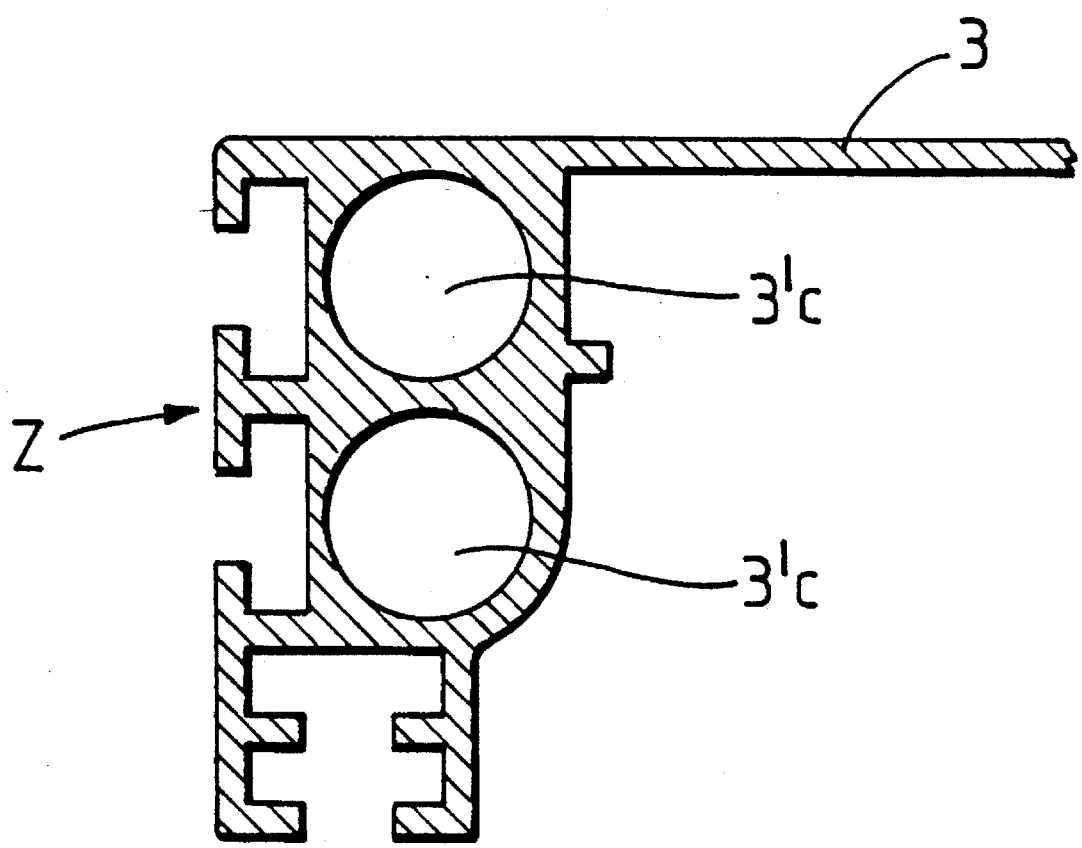
FIG. 6 shows a fragmentary view of a modified table section.

FIG. 6 shows a modified part of section 3 having two passageways 3'c (for incoming and outgoing or reclassified air) on either side of the slot 3b. A fragmentary part Z to the left of the slot 3b is shown in FIG. 6 and it is to be understood that a corresponding pair of air passageways will be formed in a part (not shown) on the right of the slot as a mirror image of part Z.

Figure 7:
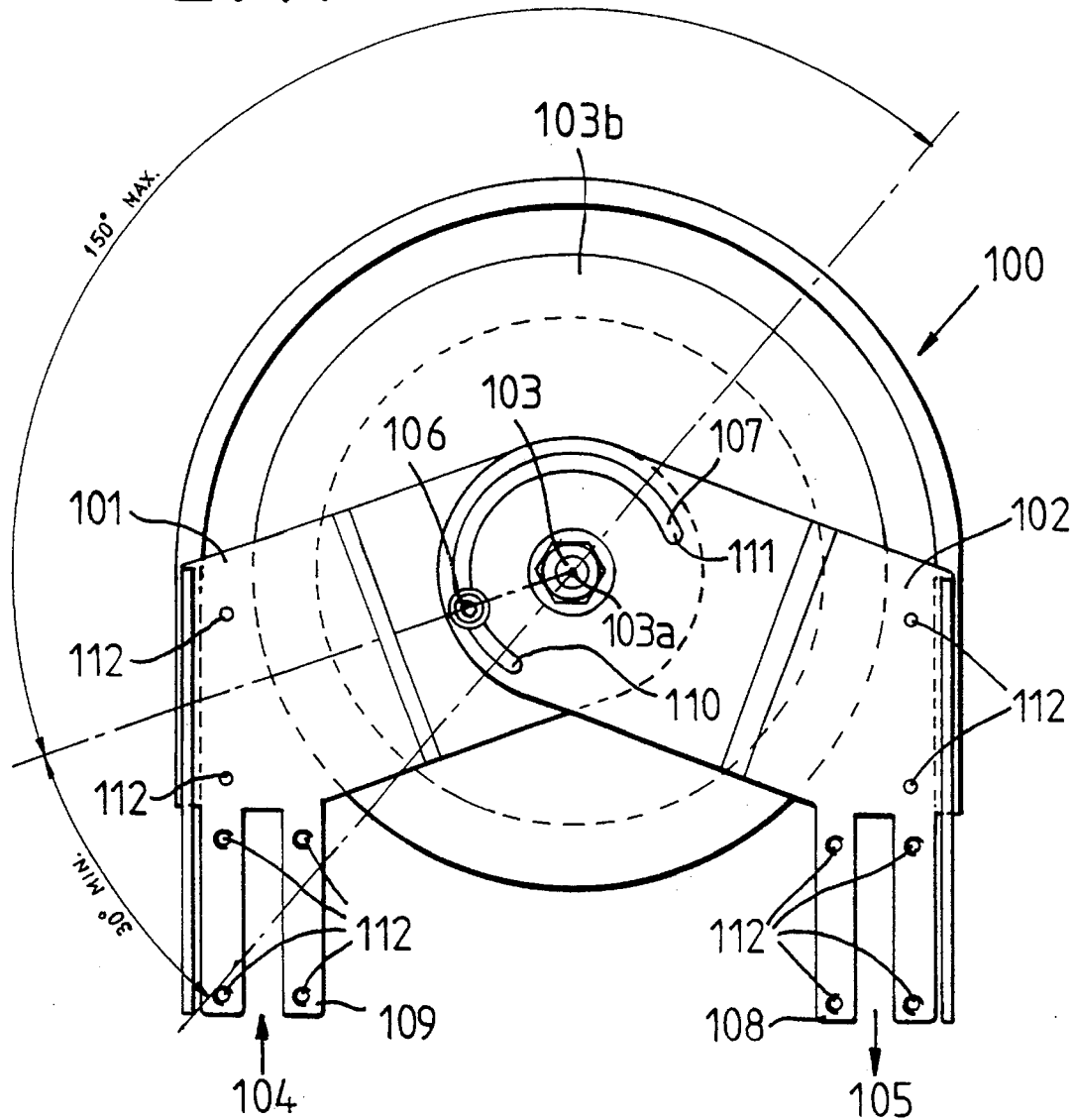
FIGS. 7 and 8 show a plan and a side view of an adjustable track bend.
Figure 8:
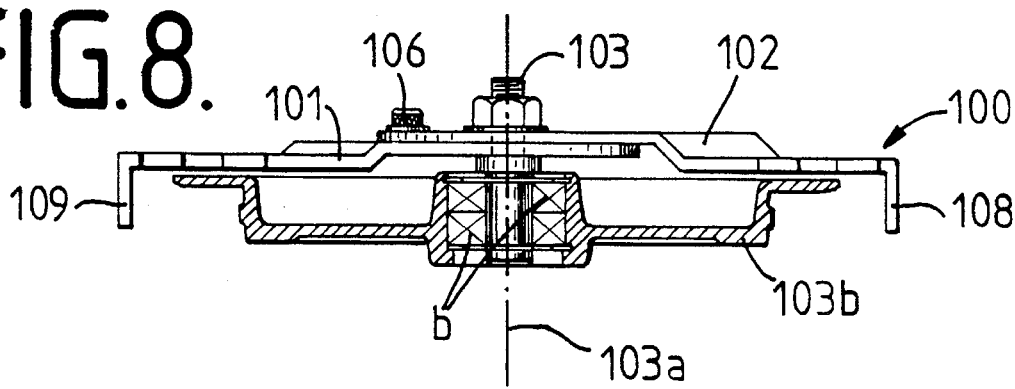
Figure 9:
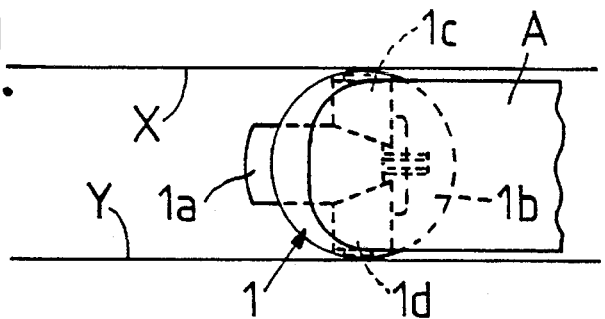
FIGS. 9 and 10 show diagrammatically a puck travelling in a track or slot prior to, and after contact with, an object placed in the path of movement of a pallet to which the puck is attached.
Figure 10:
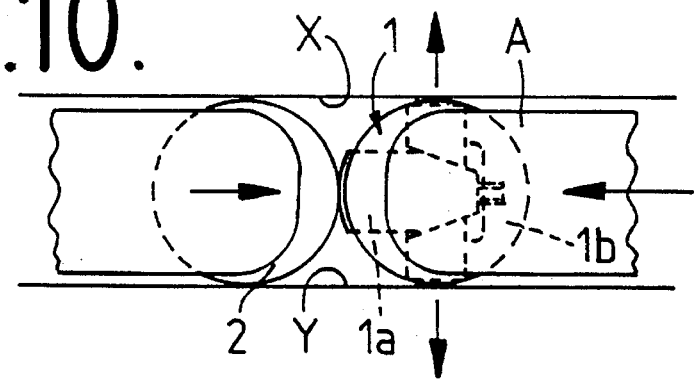
Figure 11:
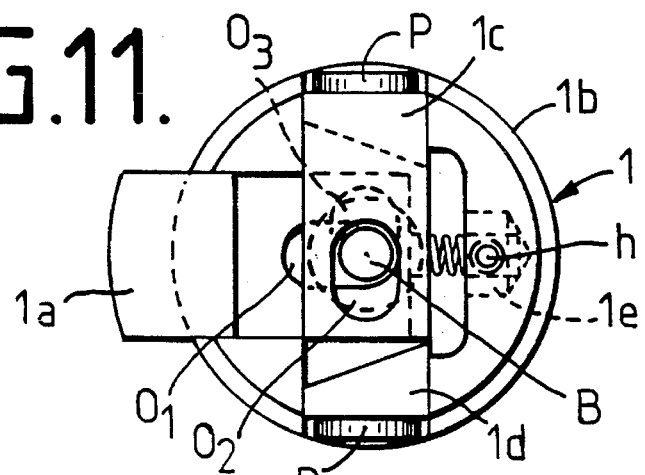
FIG. 11 shows a plan view of the puck with a top cover removed for ease of illustration.

FIGS. 7 and 8 show simplified views of an adjustable track bend 100 in which the angle thereof, and thus the angle through which a pallet is conveyed, is variable. The track bend 100 has two similar parts 101, 102 arranged to be pivotable relative to one another about vertical axis 103a (provided by pin 103) on circular stepped platform 103b. Ball bearings b are provided around pin 103 in a cylindrical portion of platform 103b. The parts 101, 102 are shown arranged relative to one another in such manner that a pallet travelling in direction 104 will be conveyed smoothly around bend 100 so that the pallet direction is reversed along direction 105, which is parallel to direction 104. As should be evident from FIG. 7, a stop 106 on part 101 extends into an arcuate slot 107 provided on part 102. Thus, from the position as shown, parts 101, 102 can be selectively rotated towards one another (ends 108, 109 being brought nearer to one another) by a maximum 30° (stop 106 engages end 110 of slot 107) or away from one another by a maximum of 150° (end 111 of slot 107 engages the stop 106). Ends 108, 109 are shaped to interface with the associated ends of a track section 3 and can be secured thereto by releasable fastening means at fastening locations 112.

According to a further aspect of the present invention there is provided a puck or buffer for a pallet movable along a track or slot in a worktop or work table of an assembly line, said puck having a member arranged, in use, to be displaceable relative to a body of said puck, on contact of said member with an object in the path of said pallet, the arrangement being that on displacement of said member relative to the body at least one braking element is moved from a non-operating position to a braking position in engagement with an associated side wall of the track or slot. Preferably, at least two braking elements are provided which engage opposite side walls of the track or slot in the braking position. Usually, rearward movement of said member relative to said body will occur on contact of said member with the object and the rearward displacement of said member actuates lateral displacement of the braking element or elements, preferably by a wedging action. Preferably, the member and braking element/s are slidably interconnected and preferably said member and/or braking element are spring loaded in order to return said member to its previous position before contact with said object and/or to return said braking element/s to the non-operating position.

Many advantages of this further aspect of the present invention will be apparent from the following description and drawings.

Figure 12:
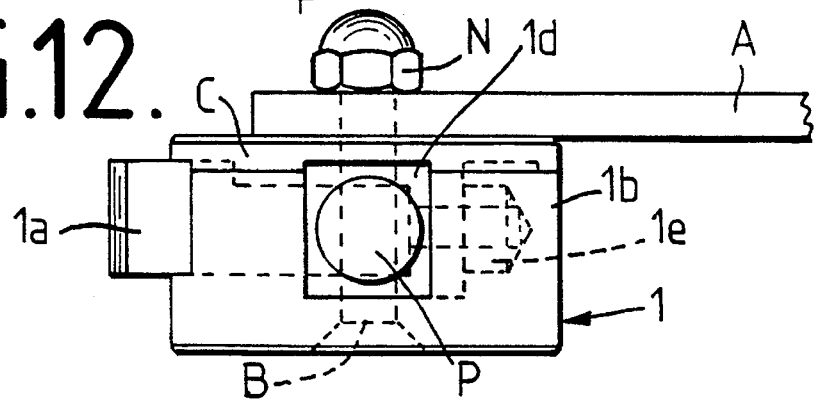
FIG. 12 shows a side view of the puck when attached to a link arm of the pallet.

Referring to FIGS. 9 to 14 of the drawings, a leading puck or buffer 1 is provided with means for braking a pallet (not shown) to which the puck is attached in use, via link arm A (see FIG. 12). Puck 1 is provided with a forwardly projecting braking member 1a slidable generally rearwardly relative to circular body 1b of the puck 1 on contact of said member 1a with an object (in the form of rear puck 2 of another pallet in FIG. 10) placed in the path thereof. Puck 1 is provided with two side braking elements 1c and 1d which are displaced laterally into contact with side walls X and Y of the slot on rearward displacement of member 1a (see FIG. 10). Rearward displacement of member 1a relative to body 1b takes place under the action of a helically coiled compression spring which seats on the rearward face of member 1a and in the pocket 1e in a manner which should be self-evident (see FIG. 14). Member 1a is slidable in slot 1f of body 1b, said slot being of complementary width to the width of member 1a and similarly braking elements 1c are slidable in respective slots 1g positioned at right angles to slot 1f (see FIG. 14). Braking elements 1c and 1d are identical but are arranged to be connected into the puck 1 in a generally inverted fashion as shown. Side 1h of member 1a has an angled wedge contact surface 1i engageable with similarly angled contact surface 1j of braking element 1c. Raised triangular portion 1k of member 1a seats in slot $1_1$ of braking element 1c with downwardly depending flange 1m slidably seating in slot 1n of member 1a. Thus, braking element 1c remains connected to member 1a throughout the relative sliding movement of said two parts. The contact of wedging surfaces 1i and 1j promotes lateral movement of the braking element on rearward movement of member 1a. Braking element 1d is connected to member 1a in a similar manner as element 1c except that the engagement surfaces are inverted in a manner which should be evident from the drawings (see FIG. 14). Member 1a and braking elements 1c, 1d are each provided with an elongate hole $O_1, O_2, O_3$ which allows the passage of a connecting bolt B (see FIG. 12) therethrough and centrally through cover C (see FIG. 13) and through link arm A for engagement by nut N, in order to attach the puck 1 to the link arm A. Cover C is attached to the body 1b by a screw (not shown) engaging in receiving hole h (see FIG. 14). Each braking element 1c, 1d is provided with a circular rubber braking pad P removably inserted into a circular receiving aperture of matching diameter. Thus, these braking pads can be easily replaced in the event of wear. The body 1, member 1a and braking elements 1c, 1d are of plastics.

It is to be understood that the scope of the present invention is not to be unduly limited by the particular choice of terminology and that a specific term may be replaced by any equivalent or generic term. Further it is to be understood that individual features, method or functions related to the assembly line system or individual parts thereof might be individually patentably inventive. The singular may include the plural and vice versa.

I claim:

1. An assembly line system in which pallets carrying workpieces are conveyed along an assembly line to work stations at which work operations are carried out on the workpieces while the pallets are held clamped at the work stations, said assembly line system including a work table defining a track for conveyor means that acts, in use, to convey pucks of each pallet along said track by frictional engagement of the pucks with the conveyor means, opposed longitudinal edges of the conveyor means being covered or protected substantially along the entire length of the track, thereby preventing access to said edges from in front of and behind each pallet whilst the pallets are conveyed along said track, said edges of the conveyor means being covered by flange means in the track, said flange means being provided by overhanging strips of L-shaped cross section, and wherein said strips have horizontal edge surfaces which act to retain said pucks lockingly in the track.

2. An assembly line system in which pallets are conveyed along an assembly line to work stations at which said pallets are held clamped in order to perform work operations on workpieces positioned, in use, on said pallets, said system including a work table defining a track and conveying means for convey pucks of a pallet along the work table by frictional engagement of the pucks with the conveyor means, said pucks being located in the track for movement therealong, said pucks being locked in position in the tracks by strips of L-shaped cross section overhanging edges of the conveyor means, and horizontal edge surfaces of the strips retain the pucks locked in position.

3. In an assembly line system, a buffer puck movable along a track, for use in guiding a pallet in a work table of an assembly line, said buffer puck having a member arranged, in use, to be displaceable relative to a body of said buffer puck, on contact of said member with an object in the path of said pallet, the arrangement being such that on displacement of said member relative to the body at least one braking element is moved from a non-operating position to a braking position in engagement with an associated side wall of the track.

4. A buffer puck as claimed in claim 3 in which at least two said braking elements are provided which, in use in the track, engage opposite side walls of the track in the braking position.

5. A buffer puck as claimed in claim 4 in which, in use, rearward movement of said member relative to said body occurs on contact of said member with the object and the rearward displacement of said member actuates lateral displacement of the braking elements.

6. A buffer puck as claimed in claim 5 in which lateral displacement of the braking elements is by a wedging action, said member and braking elements being slidably interconnected.

7. A buffer puck as claimed in claim 3 in which said member is spring loaded.

8. In an assembly line system in which pallets are conveyed, in use, along an assembly line to work stations at which said pallets are held clamped in order to perform work operations on workpieces positioned on said pallets, each pallet having a buffer puck movable along a track in a worktable on the assembly line, said buffer puck having a member arranged to be displaceable relative to a body of said buffer puck, on contact of said member with an object in the path of said pallet, the arrangement being such that on displacement of said member relative to the body at least one braking element is moved from a non-operating position to a braking position in engagement with an associated side wall of the track.

* * * * *